(12) United States Patent
Locarno et al.

(10) Patent No.: US 6,298,249 B1
(45) Date of Patent: Oct. 2, 2001

(54) RADIO APPARATUS HEAD-PROTECTIVE HELMET

(75) Inventors: Michael M. Locarno, Kinnelon; Michael J. Barthold, Flemington; Kerry W. Gordon, Mendham, all of NJ (US)

(73) Assignee: Mine Safety Appliances Company, Pittsburgh, PA (US)

( * ) Notice: Subject to any disclaimer, the term of this patent is extended or adjusted under 35 U.S.C. 154(b) by 0 days.

(21) Appl. No.: 09/168,371

(22) Filed: Oct. 8, 1998

(51) Int. Cl.$^7$ .............. H04B 1/38; H04B 7/00; H04M 1/00; H04R 25/00; H04R 1/02
(52) U.S. Cl. .............. 455/568; 455/66; 455/90; 455/344; 455/347; 455/569; 381/334; 381/375; 381/376; 381/380; 381/386; 2/5; 2/417
(58) Field of Search ................. 455/66, 568, 569, 455/550, 544, 350, 351, 347, 348, 90, 100; 2/5, 417, 148; 381/334, 370, 371, 374, 375, 376, 378, 379, 380, 386, FOR 149, FOR 187; D14/205, 206; 379/430, 433

(56) References Cited

U.S. PATENT DOCUMENTS

| | | | |
|---|---|---|---|
| D. 229,833 | * 1/1974 | Becker .................... D14/205 |
| 2,993,962 | * 7/1961 | Hothem .................... 379/430 |
| 3,325,824 | * 6/1967 | Donegan .................... 2/8 |
| 3,787,641 | * 1/1974 | Santori .................... 381/151 |
| 3,969,673 | * 7/1976 | Nordlof .................... 455/78 |
| 4,942,628 | * 7/1990 | Freund .................... 2/416 |
| 5,249,235 | * 9/1993 | Davis, II et al. .................... 381/91 |
| 5,357,654 | * 10/1994 | Hsing-Chi .................... 24/68 B |
| 5,389,917 | * 2/1995 | LaManna et al. .................... 340/825.3 |
| 5,619,754 | * 4/1997 | Thurwanger et al. .................... 2/418 |
| 5,790,681 | * 8/1998 | Leppalahti .................... 381/385 |
| 5,793,878 | * 8/1998 | Chang .................... 381/370 |
| 5,950,245 | * 9/1999 | Binduga .................... 2/417 |
| 5,970,155 | * 10/1999 | Leppalahti .................... 381/72 |
| 5,986,813 | * 11/1999 | Saikawa et al. .................... 359/630 |
| 6,104,816 | * 8/2000 | Downs, Jr. et al. .................... 281/94.1 |

* cited by examiner

Primary Examiner—Dwayne Bost
Assistant Examiner—Raymond Persino
(74) Attorney, Agent, or Firm—R. Gale Rhodes, Jr.; James G. Uber

(57) ABSTRACT

Radio interface apparatus in combination with a lapel mounted microphone and speaker and a radio and with or without a head-protective helmet, radio interface apparatus in combination with a lapel-mounted radio and with or without a head-protective helmet, and radio interface apparatus for being mounted to the nape device of a head-protective helmet.

40 Claims, 6 Drawing Sheets

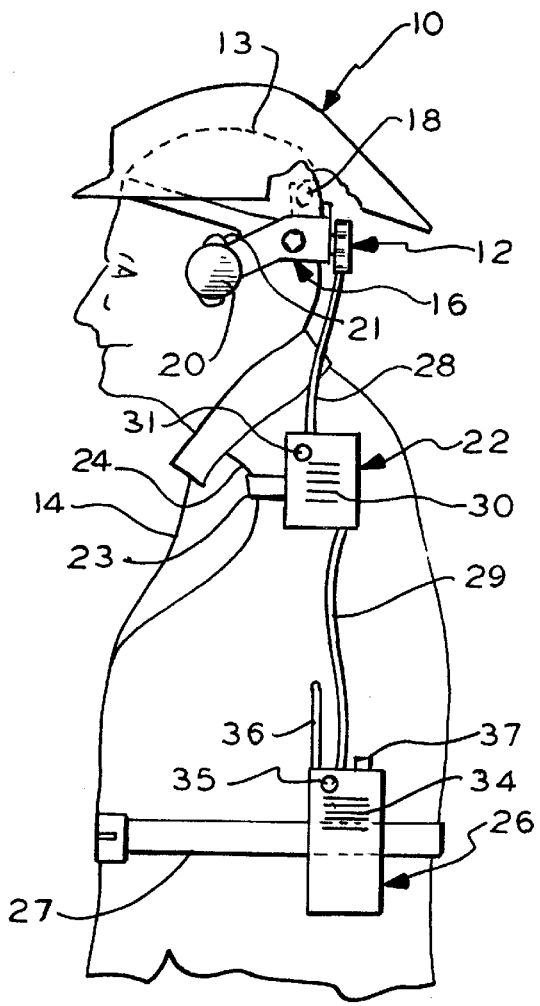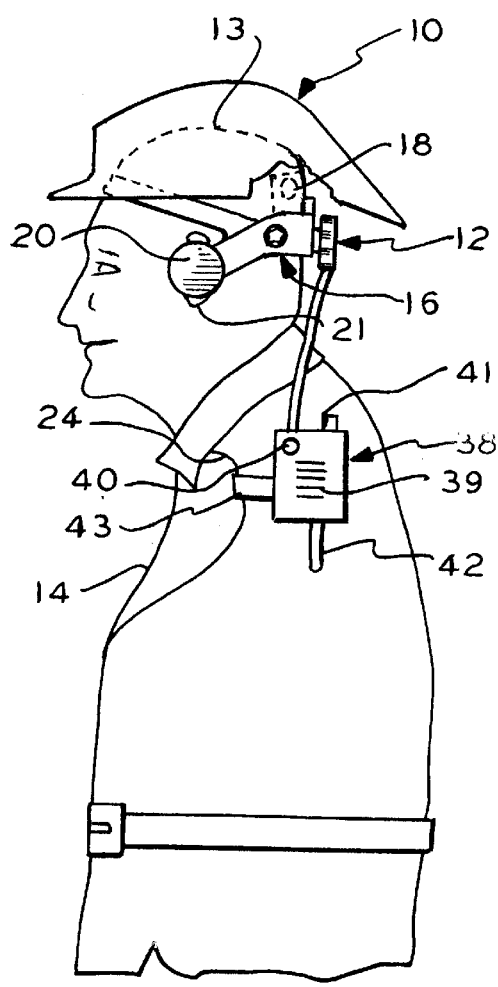

RADIO APPARATUS HEAD-PROTECTIVE HELMET

BACKGROUND OF THE INVENTION

This invention relates to combination head-protective helmet including a nape device, radio interface apparatus for being mounted to the nape device and including an ear speaker and a bone microphone, a lapel-mounted speaker and microphone and a radio to which the ear speaker and bone microphone and lapel speaker and microphone may be alternately connected and which radio may function only as a transceiver; the radio may be mounted to the clothing or belt of a wearer of the helmet. This invention further relates to combination head-protective helmet including a nape device, radio interface apparatus for being mounted to the nape device and including an ear speaker and a bone microphone and a radio which may be mounted to the clothing, such as the lapel, of a wearer of the helmet and which radio may function as a transceiver for the ear speaker and the bone microphone. Still further, this invention relates to combination radio interface apparatus including an ear microphone and a bone microphone for being mounted to the nape device of a head-protective helmet, a lapel speaker and microphone and a radio to which the ear speaker and bone microphone and lapel speaker and microphone may be alternately connected and which radio may be mounted to the clothing or belt of the wearer of the helmet and which radio may function only as a transceiver. Yet further, the present invention relates to combination radio interface apparatus including an ear speaker and a bone microphone for being mounted to the nape device of the head-protective helmet and a radio which may be mounted to the clothing such as the lapel of the wearer of the helmet in which radio may function as a transceiver for the ear speaker and bone microphone. In addition, the invention relates to radio interface apparatus including a support and an ear speaker and a bone microphone mounted to the support, the radio interface apparatus for being mounted removably to the nape device of a head-protective helmet.

Combination head-protective helmet and communication system, such as radio apparatus, are disclosed in U.S. Pat. No. 5,404,577, patented Apr. 4, 1995, entitled COMBINATION HEAD-PROTECTIVE HELMET & COMMUNICATION SYSTEM, Lawrence H. Zuckerman et als, inventors and which patent bears a face assignment to Carins & Brother, Inc. of Clifton, N.J. which is the assignee of the present invention. This patent is hereby incorporated herein by reference as if fully reproduced herein. Disclosed in FIGS. 14–17 of this incorporated patent, and described in the associated written text, are a combination head-protective helmet 20 including a flame retardant earflap 106 and a communication radio system including a transceiver 104A, a throat microphone 54A and an antenna 53A. The transceiver 106 includes an ear speaker 55A with the transceiver being mounted in a pocket formed in the earflap 106. The throat microphone 54A is mounted to an extension 136 of the earflap and the antenna 53A resides within, or underneath, the head-protective helmet 20. Although substantially removable, it will be understood that the communication system radio apparatus of the incorporate patent are substantially dedicated to the head-protective helmet including the earflap 106. This means, it is very difficult, or expensive, or greatly inconvenient, to completely remove the communication system or radio apparatus from the head-protective helmet disclosed in the incorporated patent so as to be able to use the head-protective helmet and earflap separately and without the communication system or radio apparatus. This leads to undesirable inconvenience and unnecessary expense and gives rise to need in the art for a radio apparatus which is easily mounted to and removed from a head-protective helmet which permits the radio apparatus to be transferred from helmet to helmet and whereby the helmet with the radio apparatus removed can be used separately.

Accordingly, there is need in the art for radio apparatus/head-protective helmet which overcomes the above-noted problems in the art in which provides new and improved radio apparatus/head-protective helmet.

SUMMARY OF THE INVENTION

It is the object of the present invention to satisfy the foregoing need in the art.

Apparatus satisfying such need and embodying the present invention may include combination head-protective helmet including a nape device, radio interface apparatus for being mounted to the nape device and including an ear speaker and a bone microphone, a lapel-mounted speaker and microphone and a radio to which the ear speaker and bone microphone and lapel speaker and microphone may be alternately connected and which radio may function only as a transceiver; the radio may be mounted to the clothing or belt of a wearer of the helmet. Further, apparatus satisfying such need and embodying the present invention may include combination head-protective helmet including a nape device, radio interface apparatus for being mounted to the nape device and including an ear speaker and a bone microphone and a radio which may be mounted to the clothing, such as the lapel, of a wearer of the helmet and which radio may function as a transceiver for the ear speaker and the bone microphone. Still further, apparatus embodying the present invention and satisfying such need may include combination radio interface apparatus including an ear microphone and a bone microphone for being mounted to the nape device of a head-protective helmet, a lapel speaker and microphone and a radio to which the ear speaker and bone microphone and lapel speaker and microphone may be alternately connected and which radio may be mounted to the clothing or belt of the wearer of the helmet and which radio may function only as a transceiver. Yet further, apparatus satisfying such need and embodying the present invention may include combination radio interface apparatus including an ear speaker and a bone microphone for being mounted to the nape device of the head-protective helmet and a radio which may be mounted to the clothing such as the lapel of the wearer of the helmet in which radio may function as a transceiver for the ear speaker and bone microphone. In addition, apparatus satisfying such need and embodying the present invention may include radio interface apparatus including a support and an ear speaker and a bone microphone mantel to the support, the radio interface apparatus is for being mounted removably to the nape device of a head-protective helmet.

DESCRIPTION OF THE DRAWINGS

FIG. 1 is a diagrammatical illustration of two embodiments of the present invention;

FIG. 2 is a diagrammatical illustration of two additional embodiments of the present invention;

DESCRIPTION OF THE PREFERRED EMBODIMENTS

Figure 3:
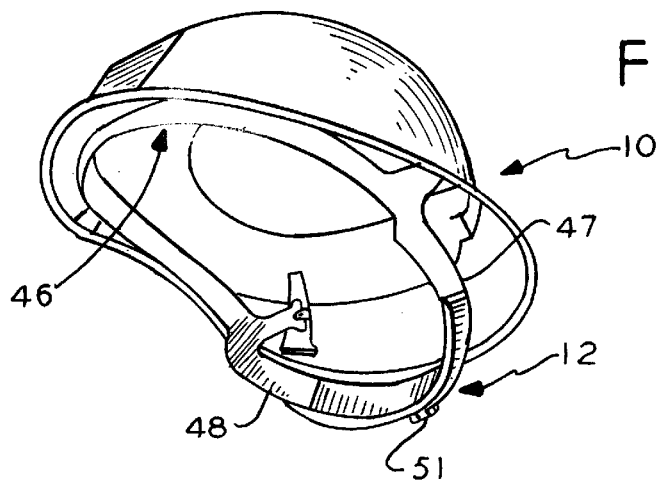
FIG. 3 is a perspective view of a head-protective helmet which may be used in combination with certain embodiments of the present invention, the helmet is shown including a nape device.

Referring to FIG. 1, there is shown a first embodiment of the present invention including, in combination, a head-protective helmet indicated by general numerical designation 10 and including a nape device indicated by general numerical designation 12 for fitting the helmet 10 to the individual head 13 of a wearer 14 of the helmet 10, radio interface apparatus indicated by general numerical designation 16 mounted removably to the nape device 12 and including a bone microphone 18 for engaging and picking up sound waves from the head bone or skull of the helmet wearer 14 and for converting the sound waves to radio signals and an ear speaker 20 for being positioned adjacent to the left ear 21 of the helmet wearer 14 and for converting radio signals to sound waves, a lapel mounted speaker and microphone indicated by general numerical designation 22 and for being mounted removably by suitable clip 23 to the lapel 24 of the clothing of the helmet wearer 14 and a suitable radio indicated by general numerical designation 26 mounted by a spring clip (not shown), to the belt 27 of the helmet wearer 14; the bone microphone 18 and ear speaker 20 of the radio interface apparatus 16 are connected by suitable cable 28 to the lapel mounted speaker and microphone 22 and the lapel-mounted speaker and microphone 22 are connected by a suitable cable 29 to the radio 26.

Figure 7:
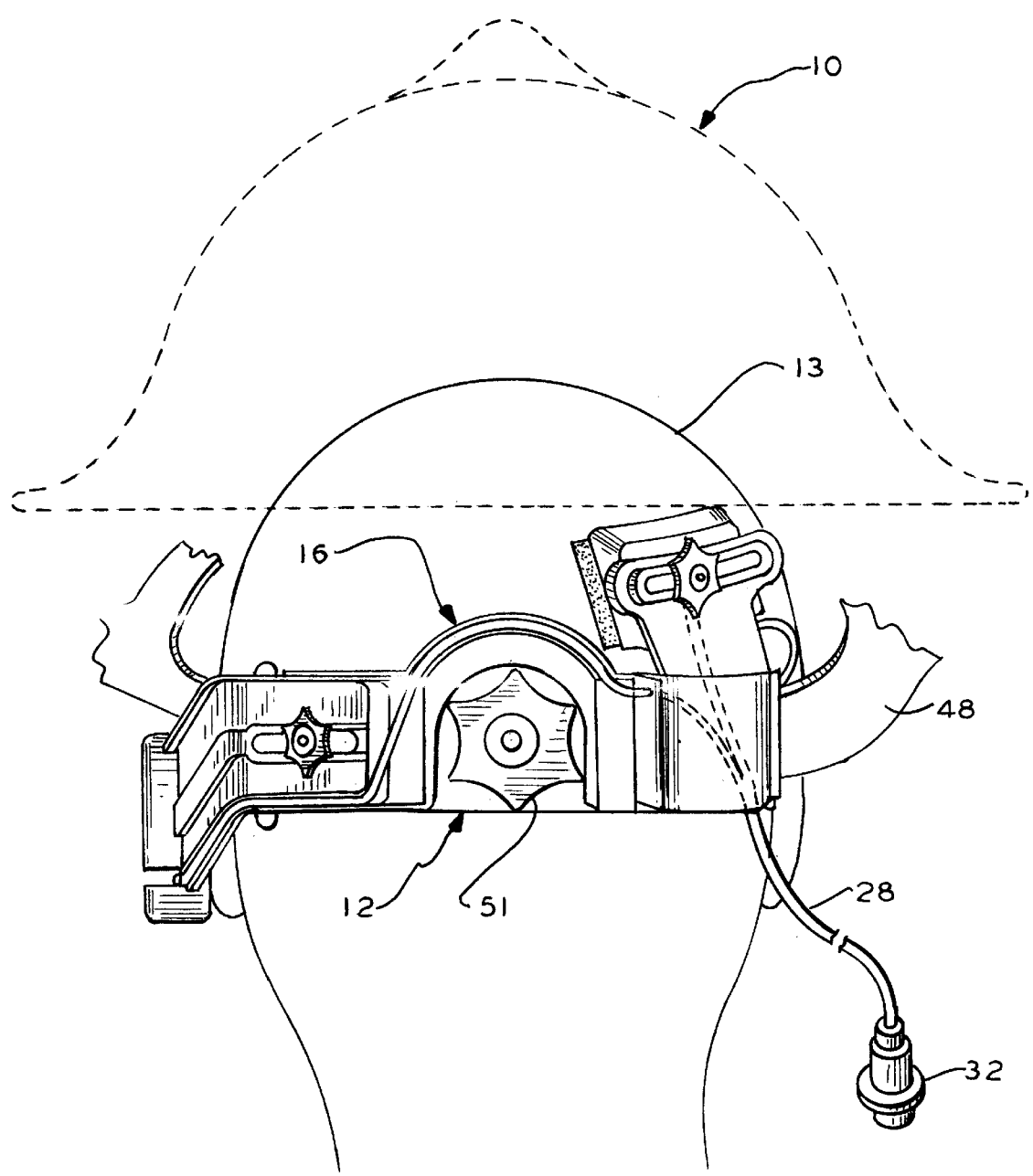
FIG. 7 is a rear view showing a head-protective helmet in dashed outline and illustrating the radio interface apparatus of the present invention mounted to the nape device of the head-protective helmet and further illustrating the manner in which the bone microphone engages the head bone or skull of a wearer of the helmet and illustrating the manner in which the speaker of the radio interface apparatus of the present invention is positioned adjacent or opposite the left ear of the wearer of the head-protective helmet.

The bone microphone 18 may be a suitable bone microphone of the type known to be art and may be, for example, bone microphone model No. 2372-3070-01 available from Stanton Magnetics, Inc., of Plainview, N.Y. 11803. The ear speaker 20 may be a suitable speaker of the type known to the art and may be, for example, speaker model No. 2373-4500-01 available from the above-noted Stanton Magnetics, Inc. The lapel-mounted speaker and microphone 22 may be of a type known to the art including a suitable lapel speaker 30, a suitable lapel microphone 31, and a suitable jack or switch (not shown) into which the plug 32 (FIG. 7) provided at the end of the radio interface apparatus cable 28 is plugged, or screwed, in a manner known to the art. Such jack or switch is of the type known to the art which upon the plug 32 being inserted there into, disconnects or disables the lapel speaker 30 and lapel microphone 31 and connects the bone microphone 18 and ear speaker 20 of the radio interface apparatus 16 to the radio 26 through the cable 29. The lapel-mounted speaker and microphone 22 may be of the type available from the above-noted Stanton Magnetics, Inc.

The radio 26 may be, for example, a suitable portable radio available from Motorola, Inc. of Chicago, Ill.

The radio 26, FIG. 1, includes a radio speaker 34, a radio microphone 35, and an antenna 36 and a speaker to talk button 37. As known to the portable radio art, the radio 26 includes a suitable internal transceiver (not shown) for receiving and transmitting radio signals. The radio 26 is also provided with a suitable jack or switch (not shown) into which a suitable plug (not shown) mounted on the end of cable 29 is inserted and which switch upon such plug being inserted disable or disconnects the radio speaker 34 and radio microphone 35 from the transceiver and connects either the bone microphone 18 and speaker 20 of the radio interface apparatus 16 or the lapel speaker 30 and lapel microphone 31, to the above-mentioned transceiver (not shown) mounted internally on the radio 26 depending on whether or not the plug 32 (FIG. 7) is plugged into the above-described jack or switch (not shown) provided in the lapel-mounted speaker and microphone 22. It will be understood, that upon the plug 32 (FIG. 7) being removed from the above-described jack or switch (not shown) provided in the lapel-mounted speaker and microphone 22, the wearer 14 of the helmet 10 may use the lapel-mounted speaker 30 and microphone 31 to communicate with the radio 26, and it will be further understood that upon the plug (not shown) provided on the end of the cable 29, FIG. 1, being removed from the radio 26, the helmet wearer 14 may use the radio 26 to communicate.

Another embodiment of the present invention includes the combination shown in FIG. 1 and described above without the head-protective helmet 10 and nape device 12 but including the radio interface apparatus 12, lapel-mounted speaker and microphone 22 and radio 26.

Referring to FIG. 2, a further embodiment of the present invention is shown which includes, in combination, the above-described head-protective helmet 10 including the nape device 12 and the radio interface apparatus 16 for being mounted removably to the nape device 12 which apparatus includes the bone microphone 18 and speaker 20, and, a lapel-mounted radio indicating by general numerical designation 38. The lapel-mounted radio 38 may be a suitable lapel-mounted radio of the type known to the art in which includes a lapel speaker 39, a lapel microphone 40, a push-to-talk button 41, an internal transceiver (not shown) and an antenna 42, and which radio 38 may be provided with a suitable spring clip 43 for mounting the radio 38 removably to the lapel 24 of the clothing of the helmet wearer 14. Radio 38 may include a suitable jack or switch (not shown) of the type known to the art into which switch the plug 32 (FIG. 7) is inserted or screwed and such jack or switch upon the plug 32 being inserted or screwed therein disables or disconnects the lapel speaker 39 and lapel microphone 40 from the transceiver and connects the bone microphone 18 and speaker 20 of the radio interface apparatus 16 to the transceiver thereby permitting the bone microphone 18 and speaker 20 to transmit and receive radio signals through such transceiver.

A further embodiment of the present invention is also illustrated in FIG. 2 and such further embodiment includes the combination shown in FIG. 2 and described above without the head-protective helmet 10 but including the radio interface apparatus 16 and the lapel-mounted radio 38.

Figure 4:
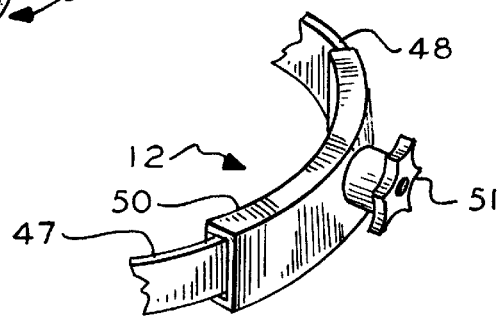
FIG. 4 is a partial and enlarged rear view of the nape device shown in FIG. 3.
Figure 6:
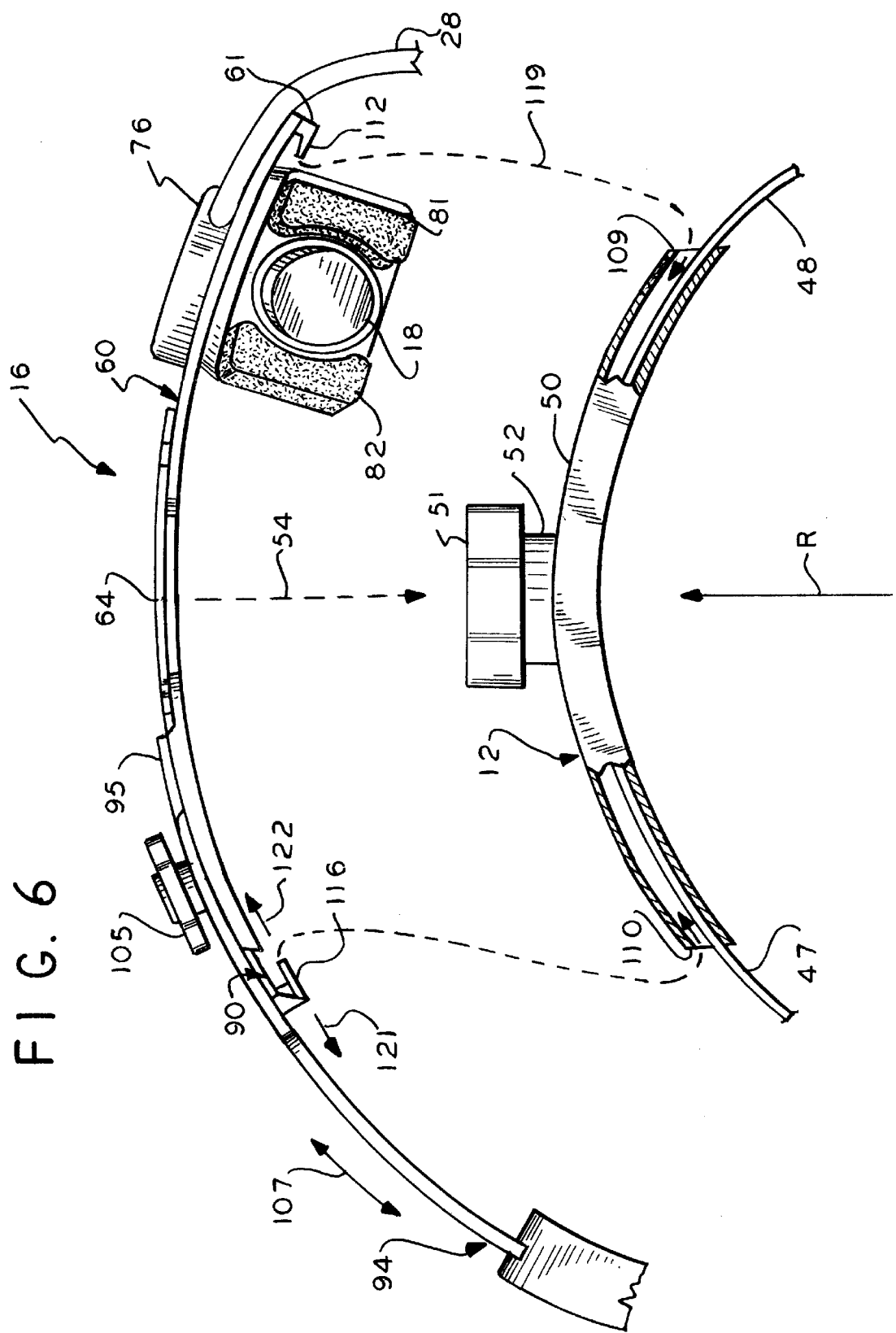

The head-protective helmet 10 and the nape device 12 are known to the art and are further shown in detail in FIGS. 3 and 4. By way of example, and not by way of limitation, head-protective helmet 10 and nape device 12 may be Fireman's Helmet Model No. 990 available from Carins & Brother, Inc., 60 Webro Road, Clifton, N. J.; Fireman's Helmet Model No. 990 includes the nape device 12. As known to the art, the nape device 12, FIG. 3, includes a head band indicated by general numerical designation 46 in which head band includes a pair of ratchet arms 47 and 48. Further, the nape device 12, as shown in FIGS. 4 and 6, includes a ratchet sleeve 50 and a ratchet knob 51. As further known to the art, the ratchet arms 47 and 48 move relative with respect to each other inside the ratchet sleeve 50 and are connected operationally to the ratchet knob 51 and, upon the ratchet knob being rotated alternately in the clockwise and counterclockwise directions as viewed in FIG. 4 the ratchet arms 47 and 48 are moved alternately towards and away from each other to adjust the size of the head band 46 (FIG. 3) to fit the individual head 13 (FIGS. 1 and 2) of the wearer 14 of the head-protective helmet 10. Significantly, note FIG. 6, the nape device 12 includes a cylindrical member 52 to which the ratchet knob 51 is mounted rotatively for operational engagement with the ratchet arms 47 and 48.

Figure 5:
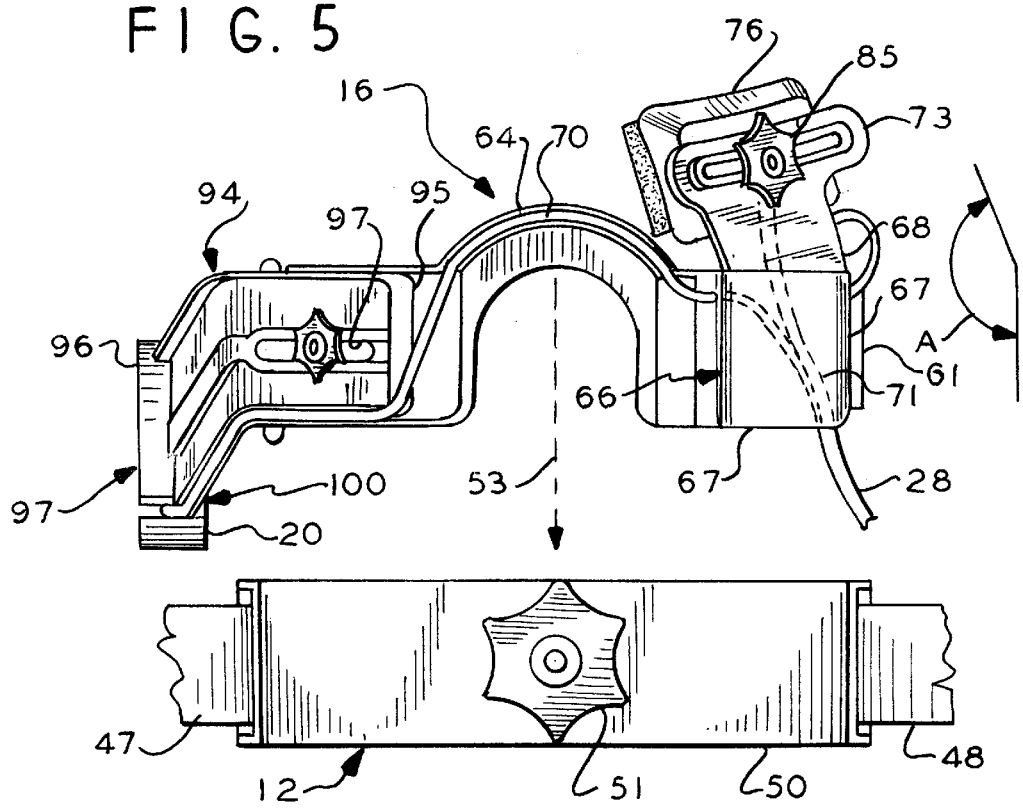
FIGS. 5 and 6 are assembly drawings illustrating the assembly of radio interface apparatus embodying the present invention to the nape device of a head-protective helmet.
Figure 8:
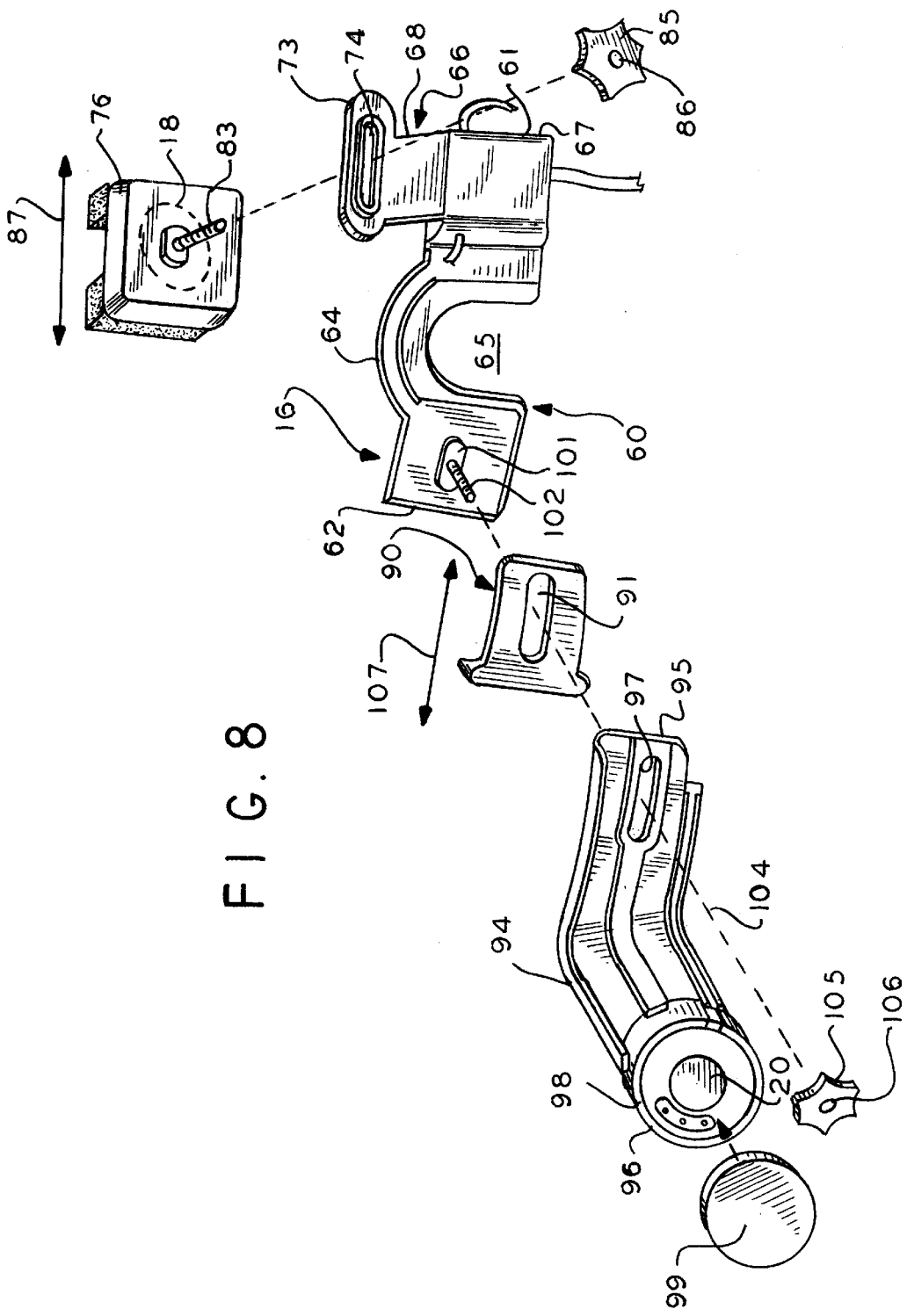
FIG. 8 is an exploded assembly view illustrating the assembly it of the components of radio network interface apparatus embodying the present invention.

Referring to FIGS. 5–8, it will be understood that the radio interface apparatus 16 is a still further embodiment of the present invention. As will be understood more particularly from FIGS. 5 and 6, the radio interface apparatus 16 is for being mounted removably to the nape device 12 as indicated generally by the dashed arrows 53 and 54 shown respectively in FIGS. 5 and 6. Referring particularly to FIG. 8, the radio interface apparatus 16 includes a support or support member indicated by general numerical designation 60 and which support includes generally opposed support end portions indicated by numerical designations 61 and 62. Intermediate end portions 61 and 62 is an intermediate portion 64 which, as viewed in FIG. 8, is an inverted generally U-shaped portion providing and inwardly extending opening 65 which opening, as will be understood from FIGS. 5 and 6, permits the mounting member 60 to be slipped over and partially surround the nape device cylindrical member 52, note particularly FIG. 6. Referring further to FIG. 8, the radio interface apparatus 16 further includes a bone microphone mounting member indicated by general numerical designation 66 and which, as viewed in FIG. 8, includes a lower portion 67 and an upper portion 68. The lower portion 67 is suitably mounted to the support end portion 61 and provides a housing. Referring to FIG. 5, it will be understood that ear speaker 20 is connected to the cable 28 by a suitable electrical conductor 70 which, as shown in solid outline in FIG. 5, winds along the support member 64 in generally serpentine fashion and which as shown in dashed outline enters the housing provided by the member 67 and connects to the cable 28, and, the bone microphone 18 (FIGS. 1 and 2) is connected to the cable 28 by suitable electrical conductor 71 which is indicated in FIG. 5 in dashed outline and a portion of which electrical conductor 71 resides within the housing provided by the member 67 and is connected to cable 28. Mounted to, or formed integrally with the upper portion 68 of the mounting member 66, FIG. 8, is a generally oblong bone microphone adjustment arm 73 providing an oblong opening 74 oriented generally parallel to the support 60. The radio interface apparatus 16 (FIG. 8) further includes a housing 76 in which the bone microphone 18 is suitably pivotally mounted such as by suitable pivotal mounting member 77 and 78 indicated diagrammatically in FIG. 10. As will be further understood from FIG. 10, suitably mounted to the housing 76, and partially surrounding the bone microphone 18, are a pair of generally semi-circular cushioning members 81 and 82, made of suitable cushioning material such as cross-linked polyethylene foam, and which cushioning members cushion the engagement of the bone microphone 18 with the head bone or skull of the helmet wearer 14 (FIGS. 1 and 2). Referring again to FIG. 8, the bone microphone housing 76 is provided with an outwardly extending threaded member 83 for being inserted through the oblong opening 74 and the housing 76 is for being fastened to the bone microphone adjustment arm 73 by a suitable microphone adjustment knob 85 provided with a generally centrally formed threaded bore 86 for threadedly engaging the threaded member 83. Upon loosening of the adjustment knob 85, the bone microphone housing 76, and thereby the bone microphone 18, may be moved laterally as indicated by the double headed arrow 87 in FIG. 8 and generally parallel in respect to the mounting member 64 and may be fastened in any one of a plurality of lateral positions along the oblong bone microphone adjustment arm 73. Accordingly, it will be understood, that the bone microphone 18 is mounted adjustably for lateral movement with respect to the bone microphone adjustment arm 73 and thereby with respect to the support 60 which facilitates or enhances the engagement, or acoustical coupling, of the bone microphone 18 with the head bone or skull of the helmet wearer 14 (FIGS. 1 and 2). As indicated by the acute angle A shown in FIGS. 5 and 10, the upper portion 68 and the lower portion 67 of the mounting member 66 are disposed angularly with respect to each other to facilitate or enhance the engagement, or acoustical coupling, of the bone microphone 18 with the head bone or skull of the helmet wearer 14 (FIGS. 1 and 2); in the preferred embodiment, the angle A is from about 40° to about 50°.

Figure 9:
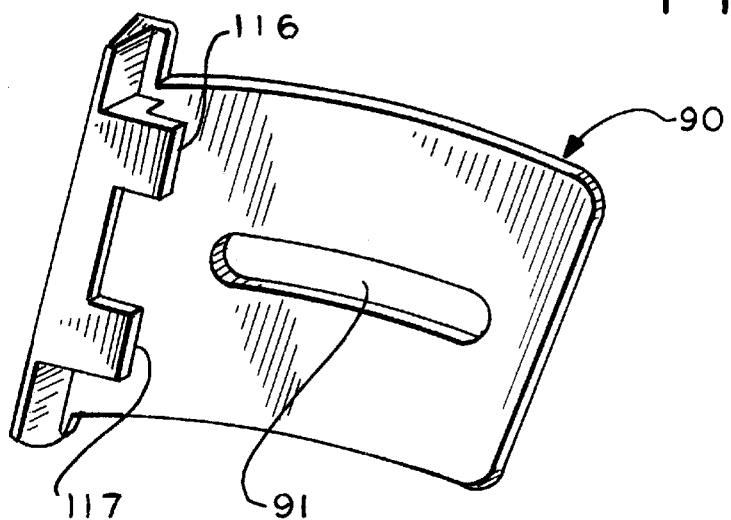
FIG. 9 is an underside view of the slidable locking slide of the present invention and illustrating in detail the structure of two gripping members for gripping one end of the ratchet sleeve of a nape device.

Referring further to FIG. 8 and to FIG. 9, the radio interface apparatus 16 further includes a slidable locking slide indicated by general numerical designation 90 and which slidable locking slide 90 is provided with a generally centrally formed and generally oblong opening 91. In addition, an referring to FIGS. 5, 6 and 8 and in particular to FIG. 8, the radio interface apparatus 16 further includes a slidable speaker arm indicated by general numerical designation 94 and which speaker arm includes generally opposed first and second end portions 95 and 96. The first slidable speaker arm end portion 95 is provided with a generally oblong opening 97 and the second end portion 96, as is best shown in FIG. 8, comprises a speaker housing indicated by general numerical designation 97 in FIG. 5, and which speaker housing 97, as is best shown in FIG. 8, includes a generally hollow cylindrical member 98 in which the ear speaker 20 is mounted and a cap or closure 99 for being fastened to the cylindrical container portion 98 and being closed over the ear speaker 20; as will be noted from FIG. 5, the ear speaker housing 90 is provided with a plurality of openings indicated by general numerical designation 100 through which sound waves from the ear speaker are transmitted to the ear such as the left ear 16 shown in FIGS. 1 and 2 of a wearer 14 of the head-protective helmet 10. Referring further to FIG. 8, the second support end portion 62 of the support member 60 is provided with an outwardly extending oblong stud 101 and extending outwardly from the oblong stud 101 is a threaded member 102. As indicated by the dashed line 104 in FIG. 8, the oblong stud 101 is received within the oblong opening 91 formed in the slidable locking slide 90 and thereafter into the oblong opening 97 formed in the end portion 95 of the slidable speaker arm 94. Interface apparatus 16, FIG. 8, further includes an adjustment knob 105 provided with a generally centrally formed threaded bore 106. As will be further understood from FIG. 8, the oblong opening 91 formed in the slidable locking arm 90 and the oblong opening 97 formed in the slidable speaker arm 94 are longer in length than link of the oblong stud 101 whereby the slidable locking arm 90 and slidable speaker arm 94 are provided with sliding reciprocal movement with respect to the oblong stud 101 and thereby with respect to the support 60, such sliding reciprocal movement is indicated by the double headed arrow 107 in FIG. 8. It will be further understood, that upon the slidable locking 90 and slidable speaker arm 94 being moved into any one of a plurality of positions with respect to the oblong stud 92 the adjustment knob 105 threadedly engages the threaded member 102 to lock or clamp the slidable locking slide 90 and the slidable speaker arm 94 against the support 60 and into one of a plurality of lateral positions with respect to the oblong stud 101 and thereby with respect to the support 60. Thus, it is understood, that the slidable locking slide and slidable speaker arm are mounted adjustably to the support end portion 62 and by adjusting the position of the slidable speaker arm 94 the speaker 20 may be moved into position to be adjacent or opposed to the left ear of an individual wearer of the helmet 10 shown in FIGS. 1 and 2.

Figure 10:
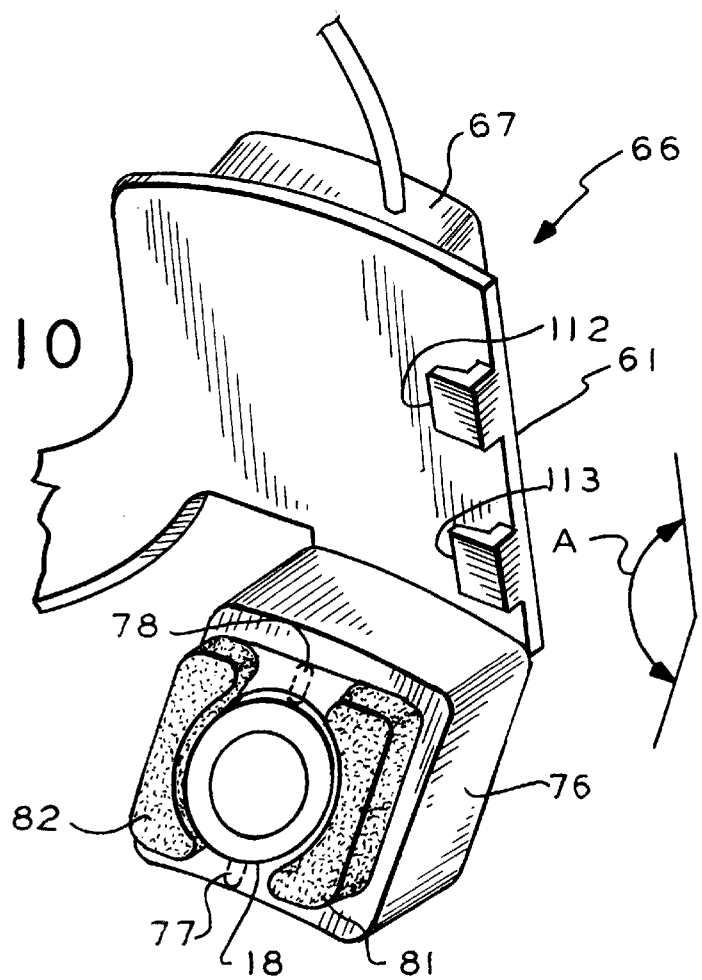
FIG. 10 is a partial view, in perspective, of one end portion of the radio interface apparatus of the present invention and illustrates in detail the structure of two locking teeth or gripping members for gripping one end of the ratchet sleeve of a nape devices, the view of the end portion of the radio interface apparatus shown in FIG. 10 is rotated 180° with respect to the view of this end portion as shown in FIG. 5.

With respect to the removable mounting of the radio interface apparatus 10 to the nape device 12 of the headprotective helmet 10 (FIGS. 1 and 2) reference is made to FIGS. 6, 9 and 10. Referring first to FIG. 6, it will be understood that the ratchet sleeve 50 is generally hollow, slidably receives the ratchet arms 47 and 48, and includes generally opposed ratchet sleeve edges or end portions 109 and 110. As shown particularly in FIG. 10, the support end portion 61 is provided with a pair of spaced apart and inwardly extending generally L-shaped locking teeth or gripping members 112 and 113 and the slidable locking slide mounting, best seen in FIG. 9, is provided with a pair of spaced apart and inwardly extending generally L-shaped locking teeth or gripping members 116 and 117. As will be understood by representative locking tooth 12 shown in FIG. 6, the locking teeth 112 and 113 (FIG. 10) are inserted under and engage the ratchet sleeve end portion 109 as indicated by the dashed line 119 in FIG. 6. As will be further understood from FIG. 6, the adjustment knob 105 is loosened from the threaded member 102 (FIG. 8) to permit the slidable locking slide to move as indicated by the arrows 121 and 122 in FIG. 6 whereby the locking teeth 116 and 117 (FIG. 9), as indicated by the representative locking tooth 116 in FIG. 6, are placed under and engage the ratchet sleeve end portion 110 after which the adjustment knob 105 is tightened to clamp and lock the slidable locking slide 90 to the support 60 to clamp the ratchet sleeve 50 between the pairs of locking teeth or gripping members 112 and 113 and 116 and 117 to thereby mount the radio interface apparatus 16 removably to the ratchet sleeve 50. To remove the radio interface 16 from the ratchet sleeve 50 the adjustment knob 105, FIG. 6, is loosened to free the slidable locking slide 90 for sliding movement leftwardly as indicated by the arrow 121 in FIG. 6 whereafter the pairs of locking teeth may be removed from beneath the opposed end portions of the sleeve 50 and the radio interface apparatus 16 removed from the ratchet sleeve. As will be further understood from FIG. 6, the pairs of locking teeth and gripping members 112 and 113 (FIG. 10) and 116 and 117 (FIG. 9) are generally disposed towards each other as will be understood from FIG. 6 with regard to representative locking teeth 112 and 116.

Referring again to FIG. 6, it will be understood that the ratchet sleeve 50 is curved and is provided with a radius of curvature R and that the radio interface apparatus 16 also is curved and provided with the radius of curvature R. More particularly, it will be understood that the support 60, the mounting portions 66 and 67 of the mounting member 66, oblong bone microphone adjustment arm 73 and bone microphone housing 76 (FIG. 8), the slidable locking slide 90 and the slidable speaker arm 94 are curved and have the radius of curvature R. Thus it will be generally understood that the curvature of the radio interface apparatus 16 is complimentary to the curvature of the ratchet sleeve 50 whereby the mounting of the radio interface apparatus to the ratchet sleeve is enhanced; the common radius of curvature R is about 3.75 inches.

Further, it will be understood, that the components shown in FIG. 8 and described above comprising the radio interface apparatus 16 may be suitably molded, such as by suitable injection molded, and the components may be made from a suitable plastic such as polycarbonate.

It will be understood that many variations and modifications may be made in the present invention without departing from the spirit and scope thereof.

What is claimed is:

1. Radio interface apparatus, comprising:
a bone microphone, a speaker, a support including generally opposed first and second support end portions, first adjustable mounting means mounted to said first support end portion and for mounting said bone microphone adjustably to said support to permit relative movement between said bone microphone and said support, and second adjustable mounting means mounted to said second support end portion and for mounting said speaker adjustably to said support to permit relative movement between said speaker and said support, said first adjustable mounting means including a first mounting portion and a second mounting portion, said first mounting portion mounted to said first support end portion, said second mounting portion including an oblong microphone mounting member providing an oblong opening disposed substantially parallel to said support, said bone microphone comprising a slidable bone microphone assembly including a bone microphone housing in which said bone microphone is mounted and a threaded member extending outwardly from said housing and residing slidably in said oblong opening, and said apparatus further including a bone microphone adjustment knob provided with a generally centrally formed threaded bore for threadedly engaging said threaded member and for locking said slidable bone assembly at one of a plurality of positions along said oblong bone microphone mounting member.

2. The apparatus according to claim 1 wherein said first mounting portion and said second mounting portion are disposed with respect to each other at an acute included angle.

3. The apparatus according to claim 2 wherein said acute angle is about 40° to about 50°.

4. The apparatus according to claim 1 wherein said support, said first mounting portion, said second mounting portion and said bone microphone housing are curved and have a common radius of curvature.

5. The apparatus according to claim 4 wherein said common radius of curvature is about 3.75 inches.

6. The apparatus according to claim 1 wherein said second adjustable mounting means comprise a generally oblong stud extending outwardly from said second support end portion, a threaded member extending outwardly from said stud and a slidable speaker arm provided with generally opposed first and second slidable speaker arm end portions, said first slidable speaker arm end portion provided with a generally oblong opening longer in length than said oblong stud and into which oblong opening said oblong stud extends to provide sliding reciprocal movement between said slidable speaker arm and said oblong stud and which sliding reciprocating movement is generally coextensive with said support, said apparatus further including a speaker adjustment knob provided with a generally centrally formed threaded bore for threadedly engaging said threaded member to lock said slidable speaker arm in one of a plurality of positions with respect to said oblong stud and thereby with respect to said support, said second slidable speaker arm end portion comprising a housing for housing said speaker.

7. The apparatus according to claim 6 wherein said support and said slidable speaker arm are curved and have a common radius of curvature.

8. The apparatus according to claim 7 wherein said common radius of curvature is about 3.75 inches.

9. The apparatus according to claim 1 wherein said second adjustable mounting means comprise a generally oblong stud extending outwardly from said second support end portion, a threaded member extending outwardly from said stud and a slidable speaker arm provided with generally opposed first and second slidable speaker arm end portions, said first slidable speaker arm end portion provided with a generally oblong opening longer in length than said oblong stud and into which oblong opening said oblong stud extends to provide sliding reciprocal movement between said slidable speaker arm and said oblong stud and which sliding reciprocating movement is generally coextensive with said support, said apparatus further including a speaker adjustment knob provided with a generally centrally formed threaded bore for threadedly engaging said threaded member to lock said slidable speaker arm in one of a plurality of positions with respect to said oblong stud and thereby with respect to said support, said second slidable speaker arm end portion comprising a speaker housing for housing said speaker.

10. The apparatus according to claim 9 wherein said first mounting portion and said second mounting portion are disposed with respect to each other at an acute included angle.

11. The apparatus according to claim 10 wherein said acute angle is about 40° to about 50°.

12. The apparatus according to claim 9 wherein said support, said first mounting portion, said second mounting portion, said bone microphone housing and said slidable speaker arm are curved and have a common radius of curvature.

13. The apparatus according to claim 9 wherein said common radius of curvature is about 3.75 inches.

14. Combination head-protective helmet and radio apparatus, comprising:

a head-protective helmet including a nape device including a ratchet sleeve including generally opposed first and second ratchet sleeve end portions, a generally cylindrical member extending outwardly from said ratchet sleeve and a rotatable ratchet knob mounted rotatably in said cylindrical member;

radio interface apparatus including a bone microphone, an ear speaker, first mounting means, second mounting means and third mounting means, said first mounting means mounting said bone microphone to said support, said second mounting means mounting said ear speaker to said support, and said third mounting means for mounting said radio interface apparatus removably to said nape device;

said support including generally opposed first and second support end portions and a generally inverted U-shaped intermediate portion intermediate said first and second support end portions, said third mounting means comprising first and second ratchet sleeve mounting means disposed respectively on said first and second support end portions, said generally inverted U-shaped intermediate portion for partially encircling said cylindrical member and said first and second ratchet sleeve mounting means for releasably engaging said first and second ratchet sleeve end portions to mount said radio interface apparatus removably to said ratchet sleeve.

15. The combination according to claim 14 wherein said radio interface apparatus further includes a first connector, a second connector and a cable terminating in a cable plug, said first connector interconnecting said bone microphone and said cable and said second connector interconnecting said speaker and said cable, and wherein said combination further comprises a lapel microphone, a lapel speaker and a first switch to which said lapel microphone and said lapel speaker are connected, said lapel microphone, said lapel speaker and said first switch mounted in a lapel housing for being mounted to the lapel of the clothing of the wearer of the head-protective helmet, said first switch connected to a lapel cable terminating in a lapel plug, and wherein said combination further comprises a radio for being carried by or mounted to the clothing of a wearer of the head-protective helmet and wherein said radio includes a radio microphone, a radio speaker, a transceiver, a second switch through which said radio microphone and said radio speaker are connected to said transceiver, and said radio further comprising an antenna and a push-to-talk button, upon said cable plug being plugged into said first switch and said lapel plug being inserted into said second switch, said lapel microphone and said lapel speaker being disabled and said radio microphone and said radio speaker being disabled and said ear speaker and said bone microphone being connected to said transceiver.

16. The combination according to claim 14 wherein said radio interface apparatus further includes a first connector, a second connector and a cable terminating in a cable plug, said first connector interconnecting said bone microphone and said cable and said second connector interconnecting said speaker and said cable, and wherein said combination further comprises a lapel mountable radio including a transceiver, a push-to-talk button, an antenna, a lapel microphone, a lapel speaker and a switch through which said lapel microphone and said lapel speaker are connected to said transceiver, said lapel microphone, lapel radio for being mounted to the lapel of the clothing of the wearer of the head-protective helmet, upon said cable plug being plugged into said switch, said lapel microphone and said lapel speaker being disabled and said ear speaker and said bone microphone being connected to said transceiver.

17. The combination according to claim 14 wherein said first sleeve mounting means comprise a first pair of spaced apart and inwardly extending generally L-shaped locking teeth disposed on said first end portion of said support and wherein said second ratchet sleeve mounting means comprise a slidable locking slide mounted for sliding reciprocal movement with respect to said second support end portion and an adjustment knob for locking said slidable adjustment slide in one of a plurality of positions with respect to said support, said slidable locking slide provided with a second pair of spaced apart and inwardly extending generally L-shaped locking teeth generally disposed opposite said first pair of spaced apart and inwardly extending generally L-shaped locking teeth, first and second said pairs of locking teeth for being inserted respectively under said first and second ratchet sleeve end portions and for engaging said opposed first and second ratchet end portions and upon said pairs of locking teeth engaging said first and second ratchet sleeve end portions said adjustment knob for locking said slidable locking slide to said support to clamp said ratchet sleeve between said first and second pairs of locking teeth to thereby mount said radio interface apparatus removably to said ratchet sleeve.

18. The combination according to claim 17 whereas said apparatus further includes a generally oblong stud extending outwardly from said second support end portion, a threaded member extending outwardly from said oblong stud and an adjustment knob provided with a generally centrally formed threaded bore for threadedly engaging said threaded member, wherein said slidable locking slide is provided with a generally oblong opening longer in length than said oblong stud and into which oblong opening said oblong stud extends to provide said sliding reciprocal movement of said slidable locking slide with respect to said second support end portion, said adjustment knob provided with a generally centrally formed threaded bore for threadedly engaging said threaded member to lock said slidable locking slide in any one of a plurality of positions with respect to said oblong stud and thereby with respect to said support.

19. The combination according to claim 18 wherein said first mounting means are first adjustable mounting means for mounting said bone microphone adjustably to said support to permit relative movement between said bone microphone and said support, and wherein said second mounting means are second adjustable mounting means for mounting said ear speaker adjustably to said support to permit relative movement between said speaker and said support.

20. The combination according to claim 19 wherein said first adjustable mounting means are mounted to said first support end portion and wherein said second adjustable mounting means are mounted to said second support end portion.

21. The combination according to claim 20 wherein said support includes an intermediate portion intermediate said first and second support end portions and wherein said intermediate portion is generally inverted U-shaped.

22. The combination according to claim 20 wherein said first adjustable mounting means includes a first mounting portion and a second mounting portion, wherein said first mounting portion is mounted to said first support end portion and wherein said second mounting portion includes an oblong bone microphone mounting member providing an oblong opening disposed substantially parallel to said support, wherein said bone microphone comprises a slidable bone microphone assembly including a bone microphone housing in which said bone microphone is mounted and a threaded member extending outwardly from said housing and residing slidably in said oblong opening, and wherein said apparatus further includes a bone microphone adjustment knob provided with a generally centrally formed threaded bore for threadedly engaging said threaded member and for locking said slidable bone microphone assembly at one of a plurality of positions along said oblong bone microphone mounting member.

23. The combination according to claim 22 wherein said second adjustable mounting means comprise a generally oblong stud extending outwardly from said second support end portion, a threaded member extending outwardly from said oblong stud and a slidable speaker arm provided with generally opposed first and second slidable speaker arm end portions, said first slidable speaker arm end portion provided with a generally oblong opening longer in length than said oblong stud and into which oblong opening said oblong stud extends to provide sliding reciprocal movement between said slidable speaker arm and said oblong stud and which sliding reciprocating movement is generally coextensive with said support, said apparatus further including a speaker adjustment knob provided with a generally centrally formed threaded bore for threadedly engaging said threaded member to lock said slidable speaker arm and thereby said speaker in one of a plurality of positions with respect to said oblong stud and thereby with respect to said support, said second slidable speaker arm end portion of said slidable speaker arm comprising a housing for housing said speaker.

24. The combination according to claim 23 wherein said first mounting portion and said second mounting portion are disposed with respect to each other at an acute included angle.

25. The combination according to claim 24 wherein said acute angle is about 40° to about 50°.

26. The combination according to claim 23 wherein said support, said first mounting portion, said second mounting portion, said bone microphone housing and said slidable speaker arm are curved and have a common radius of curvature.

27. The combination according to claim 26 wherein said common radius of curvature is about 3.75 inches.

28. Radio apparatus, comprising:
radio interface apparatus for being mounted to the nape device of a head-protective helmet, said nape device including a ratchet sleeve including generally opposed first and second ratchet sleeve end portions, a generally cylindrical member extending outwardly from said ratchet sleeve and a rotatable ratchet knob mounted rotatably in said cylindrical cylinder, said radio interface apparatus including a bone microphone, an ear speaker, first mounting means, second mounting means and third mounting means, said first mounting means mounting said bone microphone to said support, said second mounting means mounting said ear speaker to said support and said third mounting means for mounting said radio interface apparatus removably to said nape device, said support including generally opposed first and second support end portions and a generally inverted U-shaped intermediate portion intermediate said first portion and said second support portions, said third mounting means comprising first and second ratchet sleeve mounting means disposed respectively on said first and second support end portions, said generally inverted U-shaped intermediate portion for partially encircling said cylindrical member and said first and second ratchet sleeve mounting means for releasably engaging said first and second ratchet sleeve end portions to mount said radio interface apparatus removably to said ratchet sleeve.

29. The radio apparatus according to claim 28 wherein said first sleeve mounting means comprise a first pair of spaced apart and inwardly extending generally L=shaped locking teeth disposed on said first end portion of said support and wherein said second ratchet sleeve mounting means comprise a slidable locking slide mounted for sliding reciprocal movement with respect to said second support end portion and an adjustment knob for locking said slidable adjustment slide in one of a plurality of positions with respect to said support, said slidable locking slide provided with a second pair of spaced apart and inwardly extending generally L-shaped locking teeth generally disposed opposite said first pair of spaced apart and inwardly extending generally L-shaped locking teeth, first and second said pairs of locking teeth for being inserted respectively under the first and second ratchet sleeve end portions and for engaging the opposed first and second ratchet end portions and upon said pairs of locking teeth engaging the first and second ratchet sleeve end portions said adjustment knob for locking said slidable locking slide to said support to clamp the ratchet sleeve between said first and second pairs of locking teeth to thereby mount said radio interface apparatus removably to the ratchet sleeve.

30. The radio apparatus according to claim 29 wherein said support includes an intermediate portion intermediate said first and second support end portions and wherein said intermediate portion is generally inverted U-shaped.

31. The radio apparatus according to claim 29 wherein said apparatus further includes a generally oblong stud extending outwardly from said second support end portion, a threaded member extending outwardly from said oblong stud and an adjustment knob provided with a generally centrally formed threaded bore for threadedly engaging said threaded member, wherein said slidable locking slide is provided with a generally oblong opening longer in length than said oblong stud and into which oblong opening said oblong stud extends to provide said sliding reciprocal movement of said slidable locking slide with respect to said second support end portion, said adjustment knob provided with a generally centrally formed threaded bore for threadedly engaging said threaded member to lock said slidable locking slide in any one of a plurality of positions with respect to said oblong stud and thereby with respect to said support.

32. The radio apparatus according to claim 31 wherein said first mounting means are first adjustable mounting means for mounting said bone microphone adjustably to said support to permit relative movement between said bone microphone and said support, and wherein said second mounting means are second adjustable mounting means for mounting said ear speaker adjustably to said support to permit relative movement between said speaker and said support.

33. The radio apparatus according to claim 32 wherein said first adjustable mounting means are mounted to said first support end portion and wherein said second adjustable mounting means are mounted to said second support end portion.

34. The radio apparatus according to claim 33 wherein said first adjustable mounting means includes a first mounting portion and a second mounting portion, wherein said first mounting portion is mounted to said first support end portion and wherein said second mounting portion includes an oblong bone microphone mounting member providing an oblong opening disposed substantially parallel to said support, wherein said bone microphone comprises a slidable bone microphone assembly including a bone microphone housing in which said bone microphone is mounted and a threaded member extending outwardly from said housing and residing slidably in said oblong opening, and wherein said apparatus further includes a bone microphone adjustment knob provided with a generally centrally formed threaded bore for threadedly engaging said threaded member and for locking said slidable bone microphone assembly at one of a plurality of positions along said oblong bone microphone mounting member.

35. The radio apparatus according to claim 34 wherein said second adjustable mounting means comprise a generally oblong stud extending outwardly from said second support end portion, a threaded member extending outwardly from said oblong stud and a slidable speaker arm provided with generally opposed first and second slidable speaker arm end portions, said first slidable speaker arm end portion provided with a generally oblong opening longer in length than said oblong stud and into which oblong opening said oblong stud extends to provide sliding reciprocal movement between said slidable speaker arm and said oblong stud and which sliding reciprocating movement is generally coextensive with said support, said apparatus further including a speaker adjustment knob provided with a generally centrally formed threaded bore for threadedly engaging said threaded member to lock said slidable speaker arm and thereby said speaker in one of a plurality of positions with respect to said oblong stud and thereby with respect to said support, said second slidable speaker arm end portion of said slidable speaker arm comprising a housing for housing said speaker.

36. The radio apparatus according to claim 35 wherein said first mounting portion and said second mounting portion are disposed with respect to each other at an acute included angle.

37. The radio apparatus according to claim 36 wherein said acute angle is about 40° to about 50°.

38. The radio apparatus according to claim 35 wherein said support, said first mounting portion, said second mounting portion, said bone microphone housing and said slidable speaker arm are curved and have a common radius of curvature.

39. The radio apparatus according to claim 38 wherein said common radius of curvature is about 3.75 inches.

40. The radio apparatus according to claim 28 wherein said radio interface apparatus further includes a first connector, a second connector and a cable terminating in a cable plug, said first connector interconnecting said bone microphone and said cable and said second connector interconnecting said speaker and said cable, and wherein said radio apparatus further comprises a lapel microphone, a lapel speaker and a first switch to which said lapel microphone and said lapel speaker are connected, said lapel microphone, said lapel speaker and said first switch mounted in a lapel housing for being mounted to the lapel of the clothing of the wearer of the head-protective helmet, said first switch connected to a lapel cable terminating in a lapel plug, and wherein said radio apparatus further comprises a radio for being carried by or mounted to the clothing of a wearer of the head-protective helmet and wherein said radio includes a radio microphone, a radio speaker, a transceiver, a second switch through which said radio microphone and said radio speaker are connected to said transceiver, and said radio further comprising an antenna and a push-to-talk button, upon said cable plug being plugged into said first switch and said lapel plug being inserted into said second switch, said lapel microphone and said lapel speaker being disabled and said radio microphone and said radio speaker being disabled and said ear speaker and said bone microphone being connected to said transceiver.

\* \* \* \* \*